United States Patent [19]

Burke et al.

[11] Patent Number: 4,570,668

[45] Date of Patent: Feb. 18, 1986

[54] FLOW DIVIDING VALVE

[75] Inventors: Thomas A. Burke, Mentor; Curtis H. Scheuerman, Newbury, both of Ohio

[73] Assignee: Parker-Hannifin Corporation, Cleveland, Ohio

[21] Appl. No.: 571,231

[22] Filed: Jan. 16, 1984

[51] Int. Cl.[4] ............................................. F16K 15/02
[52] U.S. Cl. ............................. 137/512.2; 137/512.3; 137/541
[58] Field of Search ............... 137/512.2, 512.1, 512.3; 239/444, 446, 448, 449

[56] References Cited

U.S. PATENT DOCUMENTS 2,704,035 3/1955 Bader ................................ 137/512.2
3,727,636 4/1973 Simmons .............................. 137/541

Primary Examiner—Martin P. Schwadron
Assistant Examiner—James R. Shay
Attorney, Agent, or Firm—Frederick L. Tolhurst

[57] ABSTRACT

A flow dividing valve wherein an outer sleeve (26) is maintained in a valve body (10) and has a primary flow valve seat (32). An inner valve sleeve (50) that is slidably maintained in outer sleeve (26) has an end face (51) that cooperates with the valve seat (32) to control primary flow. A valve spool (74) that is slidably maintained in inner valve sleeve (50) cooperates with a secondary flow valve seat (70) of inner valve sleeve (50) to control secondary flow.

6 Claims, 3 Drawing Figures

FLOW DIVIDING VALVE

BACKGROUND OF THE INVENTION

1. Field of the Invention

The subject invention relates to valves suitable for use in fuel supply systems and, more particularly, flow dividing valves having a zero flow output condition.

2. Description of the Prior Art

For many years, gas turbine engines have used fuel supply systems that separated fuel flow into a primary flow and a secondary flow. Such engines are generally designed to use the primary flow for starting and at low power requirements. At higher power requirements, the engine requires that the primary flow be supplemented by the secondary flow.

Some fuel supply systems known in the prior art divided fuel flow into primary and secondary flow paths, but had no operational mode in which fuel flow to the engine was completely off. Such fuel supply systems typically incorporated flow control valves such as described in U.S. Pat. No. 3,727,636 and had two operational modes; one in which only a primary output flow was provided, and one in which both primary and secondary output flows were provided. Thus, at all times, when fluid was provided to the input port of the fuel supply system, at least one output flow would result.

For certain applications where a zero output flow condition was required, a shut-off mechanism was placed adjacent the input to the fuel supply system. For example, for gas turbine engines used on aircraft, a manifold leakage control valve was placed adjacent the inlet to the fuel nozzle. When the engine was off, the manifold leakage control valve shut off flow to the fuel nozzle. This prevented fuel flow from flowing through the primary circuit of the fuel nozzles and accumulating in the combustion chamber manifold.

While such prior art arrangements afforded a shut-off condition for the output flow of the fuel supply system, they require the use of at least two valves and resulted in increased complexity, maintenance and expense for the overall system. Thus, there was a need in the prior art for a single valve that could divide an input flow into at least two output flows and that also had a zero output flow condition such that a flow dividing valve could replace prior art fuel supply networks without need for any additional shut-off mechanisms.

SUMMARY OF THE INVENTION

In accordance with the subject invention, a flow dividing valve includes a valve body having primary flow and secondary flow output chambers. An outer sleeve that is maintained in the valve body has a primary flow valve seat and an inner sleeve that is slidably maintained in the outer sleeve has a secondary flow valve seat. The inner sleeve is movable between a fully open position and a closed position where it is seated against the primary flow valve seat. A valve spool that is slidably maintained in the inner valve sleeve is movable between a fully open position and a closed position where it is seated against the secondary flow valve seat. Both the inner sleeve and the valve spool are loaded toward their closed positions.

Preferably, the outer sleeve includes at least one radial passage and the inner sleeve includes an annular groove that comes into registry with the radial passage when the inner sleeve is moved sufficiently away from the primary flow valve seat. Also preferably, compression springs load the inner sleeve and the valve spool toward their closed positions.

Other details, objects and advantages of the subject invention will become apparent as the following description of a presently preferred embodiment thereof proceeds.

BRIEF DESCRIPTION OF THE DRAWINGS

The accompanying drawings show a presently preferred embodiment of the subject invention wherein.

DESCRIPTION OF THE PREFERRED EMBODIMENT

Figure 1:
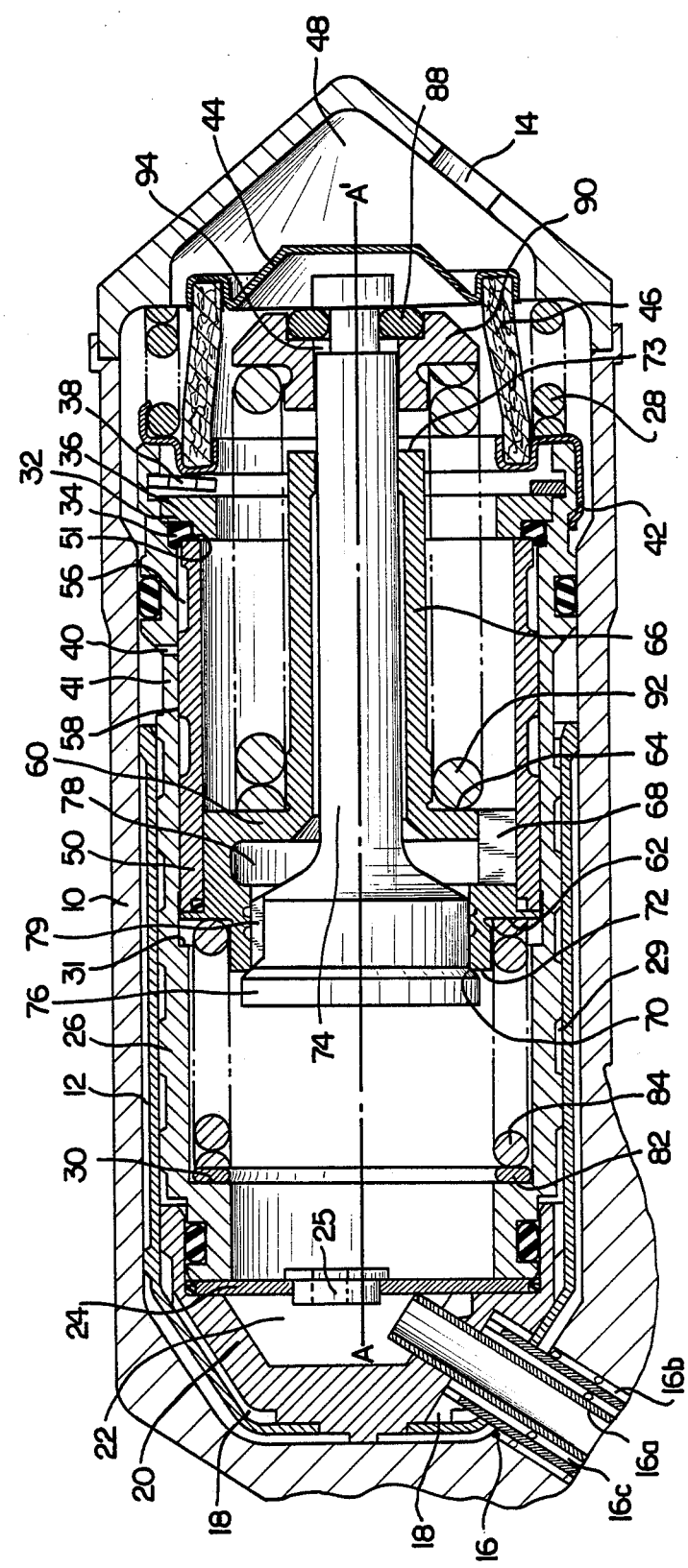
FIG. 1 is a cross-sectional view of the flow dividing valve of the preferred embodiment taken through the longitudinal center axis A—A' and showing the valve in its zero output flow position.
Figure 2:
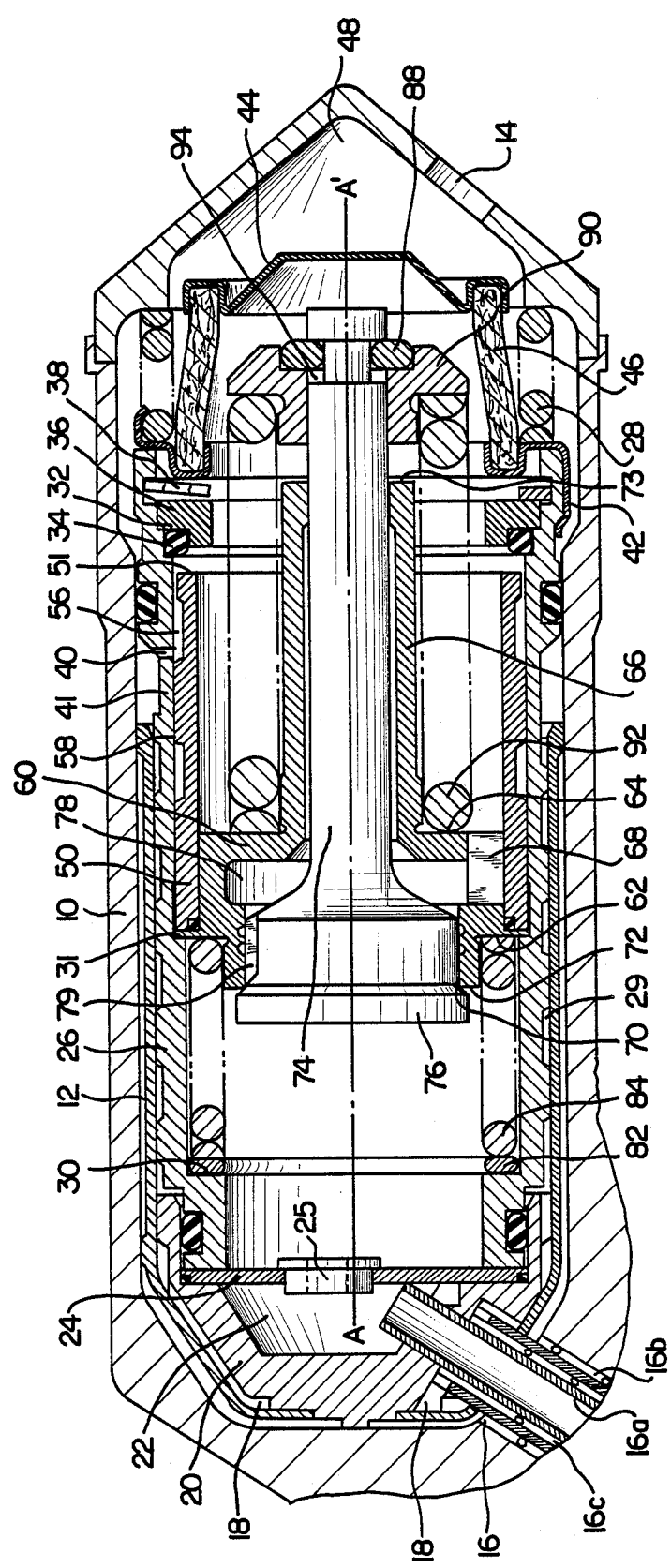
FIG. 2 is a cross-sectional view of the flow dividing valve of FIG. 1 showing the valve in its primary flow position.
Figure 3:
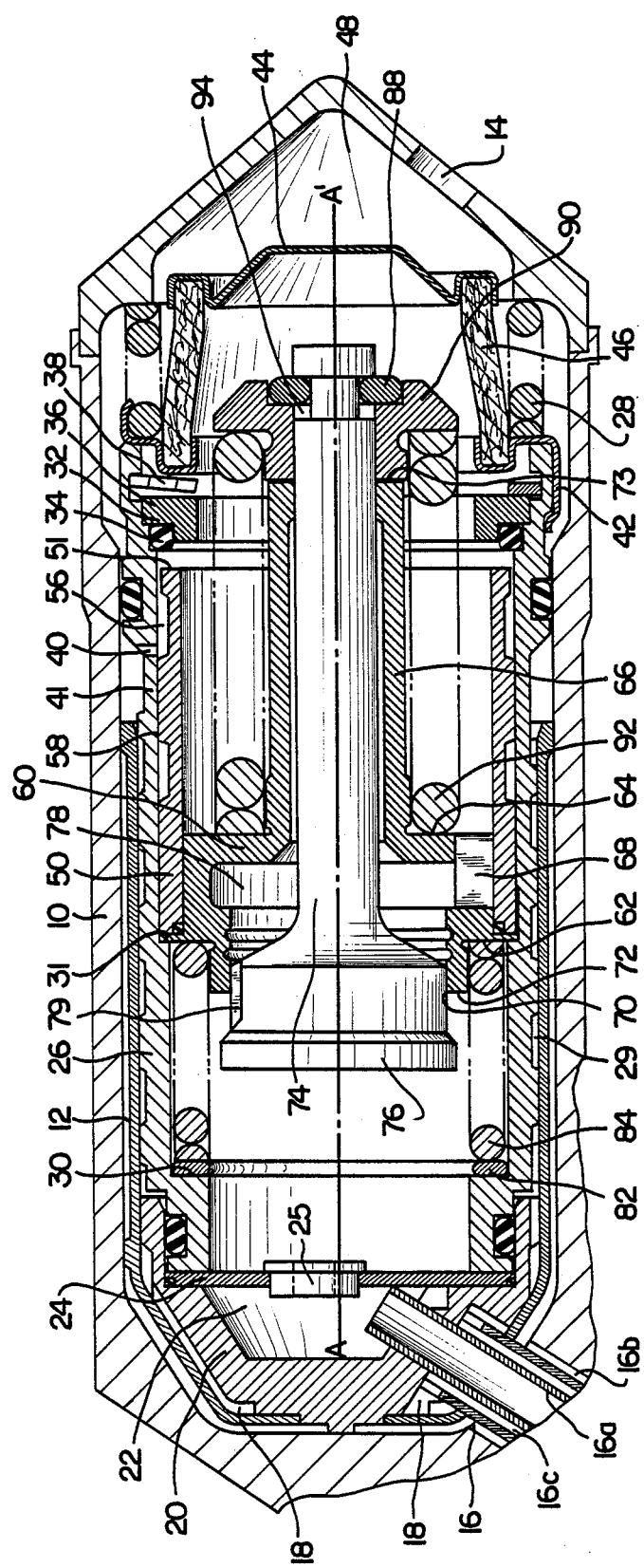
FIG. 3 is a cross-sectional view of the flow dividing valve of FIGS. 1 and 2 showing the valve in its combined primary and secondary flow position.

As shown in FIGS. 1-3, the flow dividing valve of the preferred embodiment includes a valve body 10 having a heat shield 12 as a part thereof. Valve body 10 has an input port 14 and an output port 16. Concentrically arranged output tubes 16a and 16b are secured in output port 16 and provide an annular passage 16c therebetween. Annular passage 16c is in fluid communication with a primary flow output chamber 18 that is defined by heat shield 12 and a conical frustum valve guide 20. Tube 16a is in fluid communication with a secondary flow output chamber 22 that is defined by valve guide 20 and shim plate 24 that includes a port 25. Thus, concentrically arranged tubes 16a and 16b cooperate to form an output conduit that provides isolated flow paths from primary flow output chamber 18 and secondary flow output chamber 22 through output port 16.

An outer sleeve 26 is longitudinally aligned with valve body 10 and is maintained therein against shim plate 24 by a compression spring 28. Outer sleeve 26 cooperates with heat shield 12 to form a spiral passage 29 that is in communication with primary flow output chamber 18. Outer sleeve 26 includes internal shoulders 30 and 31 and a primary flow valve seat 32. Primay flow valve seat 32 includes an o-ring 34 that is maintained by an annular retainer 36. Annular retainer 36 is held in place by a snap ring 38. Outer sleeve 26 also includes a radial passageway 40 that extends through the wall 41 of outer sleeve 26 at a selected longitudinal location.

Valve body 10 is further provided with a filter assembly that is located adacent input port 14. The filter assembly includes brackets 42 and 44 that are connected to an annular filter 46. Bracket 42 is secured between spring 28 and the adjacent end of outer sleeve 26 to locate the filter assembly inside body 10. Bracket 44 and annular filter 46 cooperate with body 10 to define an input fluid chamber 48. Fluid entering input port 14 flows into input chamber 48 and through filter 46 where it is radially inward of outer sleeve 26. Thus, filter 46 is located to remove particulate contaminates from fluid passing from chamber 48 through the disclosed valve.

An inner sleeve 50 is slidably maintained within outer sleeve 26 and is movable between a closed position and a fully open position as is hereafter more fully described. In the closed position an end face 51 of inner sleeve 50 contacts o-ring 34 of valve seat 32 to form a seal therebetween (shown in FIG. 1). In the fully open position inner sleeve 50 contacts shoulder 31 of outer sleeve 26 (shown in FIGS. 2 and 3). Inner sleeve 50 includes an annular groove 56 that is located in outer peripheral surface 58 at a longitudinal position such that, when inner sleeve 50 is in the fully open position, annular groove 56 is in registry with radial passageway 40 in outer sleeve 26.

Inner sleeve 5 also includes a spool guide 60 that has a tail portion 66 and end faces 72 and 73 with end face 72 forming a secondary flow valve seat 70 at the inner radius thereof. Spool guide 60 also includes a primary radial surface 62 and a secondary radial surface 64, with at least one passage 68 through radial surface 64.

A valve spool 74 having a collar 76 is slidably maintained in spool guide 60 of inner sleeve 50. Valve spool 74 cooperates with spool guide 60 to form an annular chamber 78 that is in communication with fiter 46 through passage 68. As hereafter more fully explained valve spool 74 is movable between a closed position and a fully open position. In the closed position, collar 76 engages secondary flow valve seat 70 (shown in FIGS. 1 and 2). In the fully open position, a spring retainer 90 contacts end face 73 (shown in FIG. 3).

Valve spool 74 includes a plurality of slots 79 that are circumferentially spaced in the peripheral surface of valve spool 74. One end of slots 79 communicates with annular chamber 78 and the other end is located adjacent collar 76 such that, when valve spool 74 is in the closed position, collar 76 and seat 70 cooperate to seal the end of slots 79, and when valve spool 74 is in the open position, slots 79 are in communication with secondary flow output chamber 22 through port 25 of shim plate 24.

A first loading means urges inner sleeve 50 toward its closed position (FIG. 1) where end face 51 of inner sleeve 50 engages o-ring 34 of primary flow valve seat 32. The first loading means includes a shim washer 82 and a compression spring 84. Shim washer 82 contacts shoulder 30 of outer sleeve 26 and compression spring 84 acts against the adjacent face of shim washer 82 and against primary radial surface 62 of spool guide 60 to urge inner sleeve 50 toward its closed position.

A second loading means urges valve spool 74 toward its closed position (FIGS. 1 and 2) where collar 76 of the valve spool engages secondary flow valve seat 70 of spool guide 60. The second loading means includes a shim 88, a retainer 90 and compression spring 92. Shim 88 engages an annular groove 94 of valve spool 74. Spring retainer 90 circumferentially surrounds the valve spool and is located adjacent shim 88 and between tail portion 66 of spool guide 60 and shim 88. Compression spring 92 circumferentially surrounds valve spool 74 and tail portion 66 of spool guide 60 and is located between retainer 90 and secondary radial surface 64 of spool guide 60. Compression spring 92 acts against the adjacent face of retainer 90 and secondary radial surface 64 to urge valve spool 74 toward its closed position.

In the operation of the flow divider valve of the preferred embodiment, FIG. 1 shows the valve in a zero output flow position with end face 51 of inner sleeve 50 engaging primary flow valve seat 32 of outer sleeve 26. Also, collar 76 of valve spool 74 engages secondary flow valve seat 70 of inner sleeve 50. In this position, no fluid will flow to either primary flow output chamber 18 or secondary flow output chamber 22.

In FIG. 2, the valve is shown in the position where flow is provided to primary flow output chamber 18, but no flow is provided to secondary flow output chamber 22. Collar 76 of valve spool 74 engages secondary flow valve seat 70 of inner sleeve 50 to to inhibit secondary flow. However, fluid pressure on end face 51 of inner sleeve 50 has overcome the loading force of compression spring 84 and shifted inner sleeve 50 to its open position where primary radial surface 62 engages shoulder 31. At the same time, end face 51 is moved out of sealing engagement with primary flow valve seat 32 and annular groove 56 is brought into registry with radial passageway 40. Thus, a flow path from input chamber 48 is established through filter 46 and the gap between end face 51 and valve seat 32 and through annular groove 56, radial passageway 40, and spiral passage 29 to primary flow output chamber 18.

FIG. 3 shows the valve in the position where flow is provided to both primary flow output chamber 18 and secondary flow output chamber 22. As in FIG. 2, primary radial surface 62 engages shoulder 31, a gap is established between end face 51 and valve seat 32, and annular groove 56 is in registry with radial passageway 40 to provide flow to chamber 18. However, fluid pressure in annular chamber 78 has been elevated to overcome the loading force of compression spring 92 and has shifted valve spool 74 so that collar 76 is moved out of sealing engagement with secondary flow valve seat 70. Thus, a flow path from input chamber 48 is established through filter 46, passage 68, annular chamber 78, slots 79 and port 25 of shim plate 24 to secondary flow output chamber 22.

While a presently preferred embodiment of the subject invention is shown and described herein, it is to be understood that the subject invention is not limited thereto but may be otherwise variously embodied within the scope of the following claims.

We claim:

1. A flow dividing valve comprising:
   a valve body having an input port, a primary flow output chamber, and a secondary flow output chamber;
   an outer sleeve maintained within said valve body and cooperating with the valve body to provide a primary flow passage that is in communication with the primary flow output chamber, said outer sleeve including a primary flow valve seat;
   an inner sleeve that is slidably maintained within said outer sleeve, said inner sleeve including a secondary flow valve seat and being movable between a first position where said inner sleeve is seated against the primary flow valve seat of said outer sleeve and a second position where a gap is provided between said inner sleeve and the primary flow valve seat;
   first means for loading said inner sleeve against the primary flow valve seat of said outer sleeve;
   a valve spool that is slidably maintained in said inner valve sleeve, said valve spool being movable between a first position where said valve spool is seated against the secondary flow valve seat of said inner sleeve, and a second position where maximum clearance is provided between said valve spool and the secondary valve seat; and
   second means for loading said valve spool against the secondary flow valve seat of said inner sleeve.

2. The flow dividing valve of claim 1 wherein said outer sleeve includes radial passageways and wherein said inner sleeve includes an annular groove that cooperates with said radial passageways to carry primary fluid flow when said annular groove is in communication with said passageways.

3. The flow dividing valve of claim 1 wherein said outer sleeve includes radial passageways and wherein said inner sleeve includes an annular groove that is brought into communication with said radial passageways when said inner sleeve is moved away from the primary flow valve seat.

4. The flow dividing valve of claim 1, 2, or 3 wherein said inner valve sleeve includes a primary radial surface, said first loading means comprising:
   a shim that is in contact with said outer sleeve; and
   a compression spring having one end in contact with said shim and the opposite end in contact with the primary radial surface of said inner valve sleeve, said shim and compression spring cooperating to urge said inner and outer sleeves in opposite directions.

5. The flow dividing valve of claim 1, 2, 3 or 4 wherein said inner valve sleeve includes a secondary radial surface, said second loading means comprising:
   a retainer that is connected to said valve spool; and
   a compression spring having one end in contact with said retainer and the opposite end in contact with the secondary radial surface of said inner valve sleeve, said retainer and compression spring cooperating to urge said inner valve sleeve and said valve spool in opposite directions.

6. The flow dividing valve of claim 1, 2, 3, 4 or 5 wherein the primary valve seat comprises:
   an annular retaining ring; and
   an o-ring that is adjacent said retaining ring and that forms a seal between said inner sleeve and said outer sleeve when compressed between said inner sleeve and said retaining ring.

* * * * *